Figure 1:
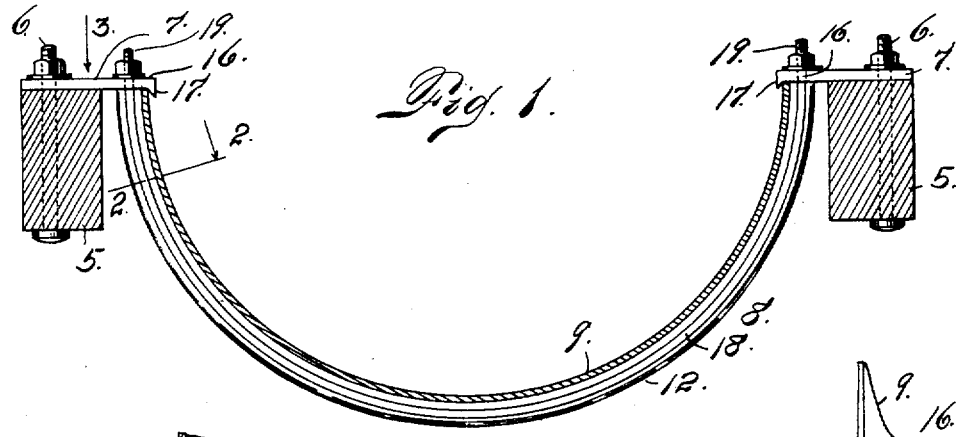

+65-122 SR
OR RE 13,586 - 881 ✓
Draftsman
BEST AVAILABLE COPY
M67

W. LENNON.

TROUGH OR OPEN FLUME.

APPLICATION FILED MAR. 31, 1913.

Reissued June 24, 1913. RE 13,586.

Witnesses
Otto E. Hoddick.
L. E. Petersen.

Inventor
William Lennon.
By A. J. O'Brien
Attorney

COLUMBIA PLANOGRAPH CO., WASHINGTON, D. C.

/6 —

Draftsman

UNITED STATES PATENT OFFICE.

WILLIAM LENNON, OF MANITOU, COLORADO.

TROUGH OR OPEN FLUME.

13,586. Specification of Reissued Letters Patent. Reissued June 24, 1913.

Original No. 1,042,239, dated October 22, 1912, Serial No. 667,837. Application for reissue filed March 31, 1913. Serial No. 758,037.

*To all whom it may concern:*

Be it known that I, WILLIAM LENNON, a citizen of the United States, residing at the city of Manitou, county of El Paso, and State of Colorado, have invented certain new and useful Improvements in Troughs or Open Flumes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in troughs or open flumes adapted for use in carrying material of any kind. The invention is, however, more especially adapted for use in carrying water for various uses.

My general object is to provide a sheet metal flume composed of sections, the flume joints being formed in such a manner as to make them perfectly tight, while at the same time, the construction is exceedingly economical.

An additional object is to so construct the joint as to present as little obstruction as possible to the flow of water, or the travel of other material through the trough or flume; and to this end I employ hanger plates, arranged on opposite sides for supporting the flume, the said plates resting on stationary side members as longitudinally disposed sills. The hanger plates project inwardly beyond the sills and the flume supporting members are attached to the inner extremities of the side plates, their inward extension beyond the sills being only such as to subserve this purpose. By virtue of this construction, the necessity for cross beams or bars extending transversely over the top of the flume is obviated; and there are also other advantages relating both to the function of the apparatus and economy of construction which will readily occur to those skilled in the art to which this invention relates. The disadvantage of the cross bars is that when rubbish, as vegetation of various kinds get into the flume, it catches on these bars, clogs the flume, and causes the water to overflow at the sides.

In my improved construction, I employ clamping members at the flume joints, the said members engaging the flume sections, both interiorly and exteriorly. The extremities of the exterior members pass upwardly through openings in the hanger plates, their protruding ends being threaded to receive nuts for tightening purposes. The extremities of the interior clamping members engage the under surfaces of the hanger plates and are pressed downwardly by the plates as the nuts are turned to tighten the exterior members.

In my improved construction, the flume sections are depressed to form beads, which extend below or exteriorly beyond the outer surfaces of the flume sections, the said beads being interiorly concave and arranged to fit into each other, the flume sections overlapping at the joints.

The interior cavity of the flume joint is filled by the use of a clamping rod, which as illustrated in the drawing, is semi-circular or approximately semi-circular in cross section. The exact shape of this clamping rod, however, will depend upon the shape of the interior cavity of the joint, which is to be filled thereby. While this cavity, as illustrated in the drawing, has the shape of a segment of a circle, it is evident that it may, if desired, be of other suitable shape, the important advantage of this feature being that it makes it practical to substantially remove all obstructions at the flume joints to the free passage or flow of water or other material through the flume or trough. The clamping rod is originally shaped to substantially fill the cavity of the joint, its exposed surface being flush with the interior surface of the flume. Its extremities engage the overlapping inner ends of the hanger plates, which extend downwardly just inside the upper extremities of each clamping rod, thus preventing any possible tendency of the rod to get out of place.

Having briefly outlined my improved construction, I will proceed to describe the same in detail, reference being made to the accompanying drawing, in which is illustrated an embodiment thereof.

Figure 2:
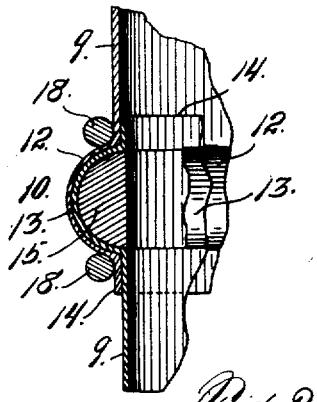
Figure 3:
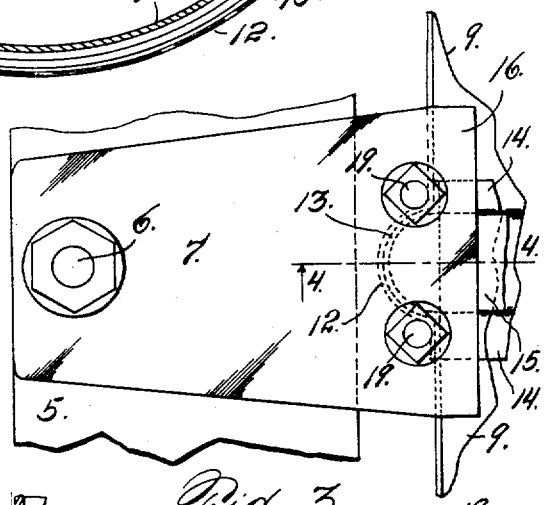
Figure 6:
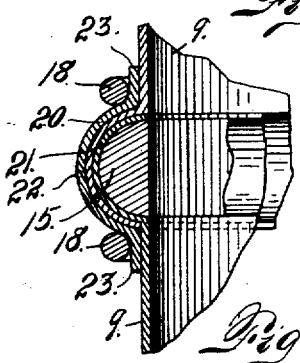
Figure 5:
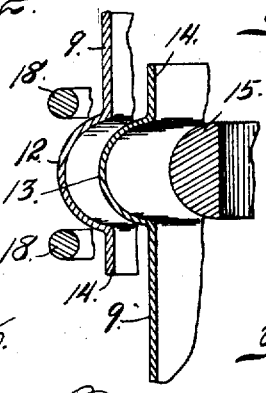
Figure 4:
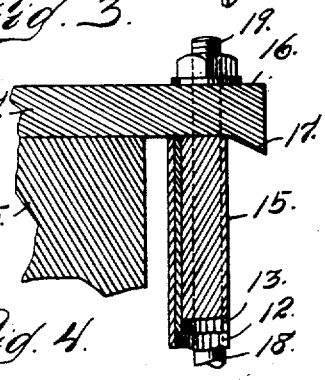

In this drawing: Figure 1 is a cross section taken through a flume equipped with my improved construction, the flume joint being shown in elevation. Fig. 2 is a section taken on the line 2—2, of Fig. 1, the parts being shown on a larger scale. Fig. 3 is a top plan view of one side of the flume, looking down on one of the hanger plates, the direction of the view being indicated by the arrow in Fig. 1, the parts being shown on a larger scale than in the last named figure. Fig. 4 is a vertical section, taken on the line 4—4, of Fig. 3. Fig. 5 is a section similar to Fig. 2, but showing the several elements separated from each other. Fig. 6 is a section, similar to Fig. 2, but illustrating a modified form of construction.

The same reference characters indicate the same parts in all the views.

Let the numeral 5 designate side sills or beams, which form the support for the flume. To the upper edges of these beams are secured in any suitable manner, as by bolts 6, hanger plates 7, which project interiorly beyond the side sills and overlap the upper edges of the flume which may be designated in its entirety by the numeral 8.

The flume is composed of sections 9 which overlap each other to form the flume joints 10.

Referring now more particularly to Figs. 1 to 5, inclusive, of the drawing, let the numerals 12 and 13 designate the overlapping and interlocking bead parts of the two flume sections 9, the said beads being formed by pressing the metal outwardly beyond the outer surface of the flume sections, the two beads being formed to interlock. Each flume section, as illustrated in the principal views, contains a short member 14, extending beyond its bead part, one member 14 engaging the inner surface of the cooperating section, while the other member 14 engages the outer surface of its companion section. The cavity of the inner bead is filled with a clamping rod 15, whose cross sectional area conforms to the shape of the cavity to be filled, whereby the inner surface of the clamping rod is flush with the inner surface of the trough or flume. The extremities of this clamping rod engage the overlapping extremities 16 of the hanger plates 7, the said extremities having downwardly projecting lugs 17, the said lugs being arranged in such proximity to the extremities of the clamping rod as to prevent the said rod from getting out of place.

By virtue of the construction just explained, it will be seen, by referring to the drawing, that there is an exteriorly projecting ridge or bead at each flume joint, while the inner surface of the joint is substantially flush with the inner surface of the flume. On opposite sides of this exterior ridge or bead are located carrier rods 18, which are located at the angles formed by the outer bead 12 and the body of the flume section. The extemities 19 of these carrier rods pass through the extremities 16 of the hanger plates, which extend inwardly beyond the side sills, nuts being applied to the threaded extremities of the rods above the hanger plates to secure the carrier rods in place. In the form of construction shown in Fig. 6, the parts of the flume sections which overlap to form the joints are designated 20 and 21. These parts are the same as the parts 12 and 13, except that the extensions 14, shown in the principal views, are wanting in the modified form of construction, and, by virtue of this omission, the inner surface of the flume is made perfectly smooth and uninterrupted at the joints. It becomes necessary, however, to employ an additional member 22, whose center portion is concavo-convex to harmonize with the exterior shape of the flume joints, the extremities 23 of this member projecting far enough beyond the bead of the joint on the exterior surface of the flume to form seats or bearings for the carrier rods 18, which perform the same function as in the other form of construction. The clamping rod 15 is also of the same construction and performs the same function as heretofore explained, when describing the principal views.

From the foregoing description, the manner of constructing my improved trough or flume, as well as the use of the same, will be readily understood and need not be further explained in detail.

Having thus described my invention, I claim:

1. The combination in a sectional metal flume, of stationary side members, hanger plates mounted on the side members and extending inwardly beyond the same, and clamping means applied to the adjacent extremities of the flume sections and connected with the inner extremities of the hanger plates for flume supporting purposes.

2. The combination in a sectional metal flume, of stationary side members, hanger plates mounted on the side members and extending inwardly beyond the same, and clamping means applied to the flume joints and connected with the inwardly projecting extremities of the hanger plates.

3. In a flume construction, side sills, hanger plates supported upon said sills and extending inwardly therefrom, flume sections the joints of which are located between said plates, inner and outer clamping members at said joints, the plates being adapted to bear against and press downwardly upon said inner clamping members, and the outer clamping members being hung from said plates.

4. In a flume construction, side sills, hanger plates supported upon said sills and extending inwardly therefrom, flume sections the joints of which are located between said plates, said joints being beaded outwardly, inner clamping bars located in said beads, outer supporting members engaging said beads, the plates being adapted to bear Draftsm against and press downwardly upon said inner clamping bars, and the supporting members being hung from said plates.

5. In combination, side sills, hanger plates secured thereto, and extending inwardly beyond the same, flume sections arranged end to end, means applied exteriorly to the flume on each side of the joints between the sections and connected with the hanger plates for supporting the flume in place, the joint being beaded outwardly between said means, a clamping bar arranged within each of the beads, the extremities of said rods abutting against the inwardly projecting extremities of the hanger plates, the line of centers of said means passing through said clamping bar.

6. A flume built of sections, each section being bent near one extremity at least to form an outwardly extending bead at the joint between sections, a clamping bar arranged within said bead, supporting means arranged exteriorly upon each side of the bead, the line of centers of said means piercing said clamping bar, and hanger elements for the support of the flume at the joints, the extremities of the clamping bars being adapted to abut against the hanger elements upon the under surface and the supporting means being mounted therein.

7. A flume built of sections, the joints between the sections being beaded outwardly, a clamping bar arranged within said beaded portion, securing means arranged to extend along each side of the beads exteriorly, plates at the ends of the joints, the extremities of the clamping bar being arranged to abut against the plates, said exterior clamping means being secured to said plates on opposite sides of the bead, the line of centers of said securing means piercing the said clamping bar.

8. A flume built of sections, the joints between the sections being beaded outwardly, a clamping bar arranged within each bead, clamping rods arranged to extend along the sides of the beads exteriorly, plates at the ends of the joints, the extremities of the clamping bars being arranged to abut against the plates, said rods extending through openings in the plates and being threaded at their extremities and nuts applied to said threaded extremities, the line of centers of said rods piercing the clamping bar, substantially at its center line.

9. A flume including side sills, hanger plates secured thereto and extending interiorly beyond the same, flume sections having exteriorly-projecting overlapping and interlocking hollow beads, a clamping rod shaped to fill the interior cavity of the bead, the extremities of the said rod abutting against the interiorly-projecting extremities of the hanger plates, and means applied exteriorly to the flume on each side of the joint and connected with the hanger plates for supporting the flume in place, the line of centers of said means passing through said clamping rod, substantially as described.

10. A flume including side sills, hanger plates secured to the sills and projecting interiorly beyond the same, flume sections having their adjacent extremities equipped with hollow beads arranged to overlap each other in interlocking relation, a clamping rod in the interior cavity of the joint, the extremities of the rod engaging the overlapping extremities of the hanger plates, carrier rods applied to the securing member on opposite sides of the joint bead and secured at their extremities to the hanger plates, said rods being so positioned that a straight line through their centers will pierce the clamping rod substantially at its median line, substantially as described.

In testimony whereof I affix my signature in presence of two witnesses.

WILLIAM LENNON.

Witnesses:
IDA M. MENNEY,
MARGARET E. LENNON.

Copies of this patent may be obtained for five cents each, by addressing the "Commissioner of Patents, Washington, D. C."